US006853905B2

(12) United States Patent
Barton

(10) Patent No.: US 6,853,905 B2
(45) Date of Patent: *Feb. 8, 2005

(54) METHOD AND SYSTEM FOR OBTAINING USER FEEDBACK REGARDING GEOGRAPHIC DATA

(75) Inventor: Mark Barton, Schaumburg, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/768,349

(22) Filed: Jan. 30, 2004

(65) Prior Publication Data

US 2004/0186661 A1 Sep. 23, 2004

Related U.S. Application Data

(63) Continuation of application No. 09/590,213, filed on Jun. 8, 2000, now Pat. No. 6,718,258.

(51) Int. Cl.[7] .............................................. G01C 21/26
(52) U.S. Cl. ....................... 701/200; 701/208; 701/210; 340/991; 709/217; 342/357.1
(58) Field of Search ................................ 701/200, 208, 701/211, 214, 210; 340/991, 992, 993, 995.12, 995.17, 995.22, 995.25, 995.14; 342/357.1, 357.08, 357.09, 357.14; 717/168, 173, 177; 709/201, 217

(56) References Cited

U.S. PATENT DOCUMENTS

| 5,732,383 A | * | 3/1998 | Foladare et al. .......... 455/456.5 |
| 5,867,110 A | * | 2/1999 | Naito et al. ............ 340/286.05 |
| 5,893,113 A | | 4/1999 | Jasper et al. |
| 5,919,246 A | | 7/1999 | Waizmann et al. |
| 5,999,878 A | | 12/1999 | Hanson et al. |
| 6,038,568 A | | 3/2000 | Jasper et al. |
| 6,240,294 B1 | * | 5/2001 | Hamilton et al. ......... 455/456.3 |
| 6,718,258 B1 | * | 4/2004 | Barton ....................... 701/200 |

FOREIGN PATENT DOCUMENTS

| EP | 01342577 | 9/1991 |
| JP | 10160529 | 6/1998 |

OTHER PUBLICATIONS

Navigation Technologies Corporation, Driver feedback error reporting form, http:www.navtech.com/database/data_driver.html (2000) (month is not available).

* cited by examiner

Primary Examiner—Tan Q. Nguyen
(74) Attorney, Agent, or Firm—Frank J. Kozak; Jon D. Shutter; Lawrence M. Kaplan

(57) ABSTRACT

A reporting program and system whereby end users of navigation systems, or other computing platforms that use geographic data to obtain navigation-related or map-related services, can make reports about the geographic data. The reporting program can be used by end users to report perceived errors or inaccuracies in the geographic data. The end users can use their own personal computers, or other computing devices, to access the reporting program over a network, such as the Internet. When an end user accesses the reporting program, the reporting program provides a graphical map image to the end user on the end user's computing platform. The reporting program allows the end user to zoom and pan the graphical map image in order to display an image of the area about which the end user wishes to make a report. When the area about which the end user wishes to make a report is displayed on the end user's display screen, the reporting program allows the end user to mark up the graphical map image to illustrate a change. The reporting program also allows the end user to include text to describe a change. The reporting program captures the end user's graphical and text input as a report that is used to update or check the geographic database, as appropriate.

20 Claims, 7 Drawing Sheets

METHOD AND SYSTEM FOR OBTAINING USER FEEDBACK REGARDING GEOGRAPHIC DATA

REFERENCE TO RELATED APPLICATIONS

The present application is a continuation of Ser. No. 09/590,213, filed Jun. 8, 2000, now U.S. Pat. No. 6718,258 the entire disclosure of which is incorporated herein by reference.

BACKGROUND OF THE INVENTION

The present invention relates to geographic data used in navigation systems and more particularly the present invention relates to a method and system to obtain end user input regarding perceived errors or inaccuracies in the geographic data used in navigation systems or used by on-line sites that provide navigation-related or map-related services.

Navigation systems provide useful features, such as calculating a route to a desired destination and providing guidance for following the route. In order to provide these features, navigation systems use geographic data that include information about the locations of roads and intersections, estimated travel times along road segments, the speed limits along roads, etc. Using these kinds of geographic data, programming included in a navigation system can find an optimal (e.g., fastest or shortest) route to a specified destination.

Although navigation systems provide useful features, there still exists room for improvement. One area in which there is room for improvement relates to the collection of geographic data. The collection of geographic data for use in navigation systems is a significant undertaking. The initial collection of data about the roads in a geographic area is a significant task. Beyond the effort involved in collecting data for use in navigation systems, there is a continuing need to update and check the geographic data. Just like conventional printed maps, geographic data used in navigation systems becomes out-of-date. For example, new roads are built, businesses change locations, road construction closes roads, detours are established, museum and restaurant hours change, etc. Thus, the collection of geographic data for navigation systems is a continuing effort.

One useful way to collect geographic data is to obtain feedback from end users who have navigation systems. End users who have navigation systems may discover that certain geographic data used in their navigation systems are not correct or are inaccurate. When this occurs, it would be useful to provide a means by which the end user can report the error or inaccuracy to the geographic database developer. Using such reports from end users, the geographic database developer can make corrections to a master copy of the geographic database, which is then used to make new, updated versions of geographic databases for use in navigation systems.

End users can also obtain navigation-related and map-related services from on-line providers. For example, routing instructions and maps can be obtained from certain Internet sites. These on-line providers may use the same or similar geographic data that are used in vehicle navigation systems. End users who use on-line provider sites to obtain navigation-related and map-related services may also encounter errors or inaccuracies in the geographic data. Accordingly, it would also be useful to obtain feedback from the end users that use on-line provider sites to obtain navigation-related and map-related services about perceived errors in the geographic data.

Accordingly, there exists a need to obtain end user feedback about perceived errors in geographic data used in navigation systems or by on-line sites that provide navigation-related and map-related services.

SUMMARY OF THE INVENTION

To address these and other objectives, the present invention comprises a reporting program and system whereby end users of navigation systems, or other computing platforms that use geographic data to obtain navigation-related or map-related services, can make reports about the geographic data. The reporting program can be used by end users to report perceived errors or inaccuracies in the geographic data. The end users can use their own personal computers, or other computing devices, to access the reporting program over a network, such as the Internet. When an end user accesses the reporting program, the reporting program provides a graphical map image to the end user on the end user's computing platform. The reporting program allows the end user to zoom and pan the graphical map image in order to display an image of the area about which the end user wishes to make a report. When the area about which the end user wishes to make a report is displayed on the end user's display screen, the reporting program allows the end user to mark up the graphical map image to illustrate a change. The reporting program also allows the end user to include text to describe a change. The reporting program captures the end user's graphical and text input as a report that is used to update or check the geographic database, as appropriate.

DETAILED DESCRIPTION OF THE PRESENTLY PREFERRED EMBODIMENTS

Figure 1:
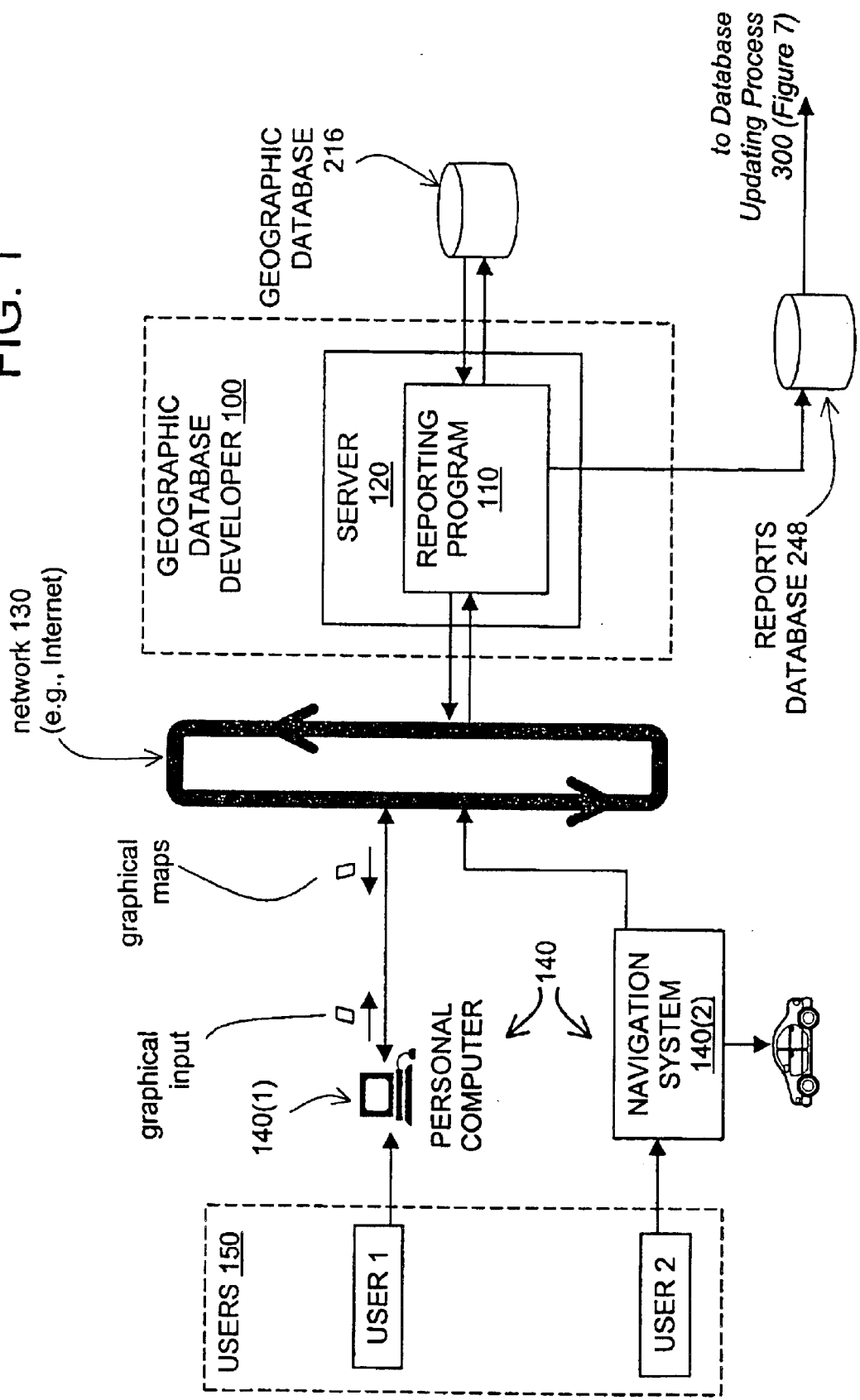
FIG. 1 is a block diagram of a system for collecting end user feedback regarding a geographic database.

Referring to FIG. 1, a database developer 100 operates a reporting program 110. The reporting program 110 is located on a server 120 that is connected to a network 130, such as the Internet. End users 150 operate computing platforms 140 to access the reporting program 110. The computing platforms 140 used by the end users 150 can be any type of device or system that is able to access the server 120 over the network 130. For example, the computing platforms 140 include personal computers 140(1) and vehicle navigation systems 140(2). The computing platforms 140 may also include other types of computing devices or systems, such as personal digital assistants.

The computing platforms used by end users include appropriate software to access the server 120 over the network 130. If an end user uses a personal computer to access the server 120, the reporting program 110 may be accessed using an Internet browser. Other communications software may also be used.

The end users 150 access the reporting program 110 in order to make reports about geographic data. In particular, the reporting program 110 may be used by the geographic database developer 100 to obtain reports from the end users 150 about perceived errors or inaccuracies in the geographic data used in the navigation systems of the end users or by on-line provider sites that are used by the end users to obtain navigation-related and map-related services. The perceived errors or inaccuracies can be of any type and may be encountered in various different ways. One of the ways that end users can encounter perceived errors or inaccuracies is during operation of in-vehicle navigation systems. For example, while being guided to follow a route to a destination, a navigation system may provide the end user with incorrect, inaccurate or confusing guidance. According to this example, the navigation system may advise the end user to "TURN LEFT AT THE NEXT INTERSECTION" but the next intersection has a sign that prohibits left turns. According to another example, the navigation system may identify a street by a wrong name.

There are various reasons why a navigation system may provide incorrect, inaccurate or confusing guidance to an end user. One possible cause is that the geographic data used by the navigation system may be incorrect. The geographic data may be incorrect because of an error made when the data were being collected. Alternatively, the geographic data used by the navigation system may be incorrect because the physical feature represented by the geographic data changed since the time the geographic data used by the end user's system was prepared.

Another possible cause for an end user receiving incorrect, inaccurate or confusing guidance from a navigation system can be an error in the software programming in the navigation system. In this case, the geographic data may be correct but the end user receives incorrect, inaccurate or confusing guidance because the software programming the navigation system does not use the geographic data properly. For example, if the navigation system software determines a vehicle's position incorrectly, a wrong street name may be provided thereby giving the end user the impression that the geographic data are incorrect when in fact the navigation programming caused the error.

Another reason why a navigation system may provide incorrect or confusing guidance is that the geographic data used by the navigation system may not include the attributes that are necessary to provide better instructions. For instance, the data representing roads located in some geographic areas may not contain one-way information because one-way street information has not yet been collected for those areas. Alternatively, the software programming in the navigation system may not consider one-way streets when providing driving directions.

As mentioned above, navigation-related and map-related services can also be obtained from on-line providers. End users may access on-line provider sites from their own personal computers or other platforms or appliances to obtain navigation-related and map-related services. An end user using an on-line provider site to obtain navigation-related and map-related services may also encounter incorrect, inaccurate or confusing information. On-line providers of navigation-related or map-related services may use the same or similar geographic data and software programming that are used in vehicle navigation systems. Therefore, on-line provider sites may give incorrect, inaccurate or confusing navigation-related or map-related information for the same reasons as explained above in connection with vehicle navigation systems.

Regardless of the cause of a perceived error, the reporting program 110 provides a means by which a report about the perceived error can be obtained from an end user. As stated above, the end users 150 operate computing platforms 140 to access the reporting program 110. The computing platform 140 used by an end user to access the reporting program 110 may not necessarily be the same computing platform that the end user was using when the navigation-related or map-related information containing the perceived error was obtained. For example, an end user may perceive an error with the geographic data used by his/her vehicle navigation system while driving in his/her vehicle, but then accesses the reporting program later at home using his/her personal computer with Internet access.

Figure 2:
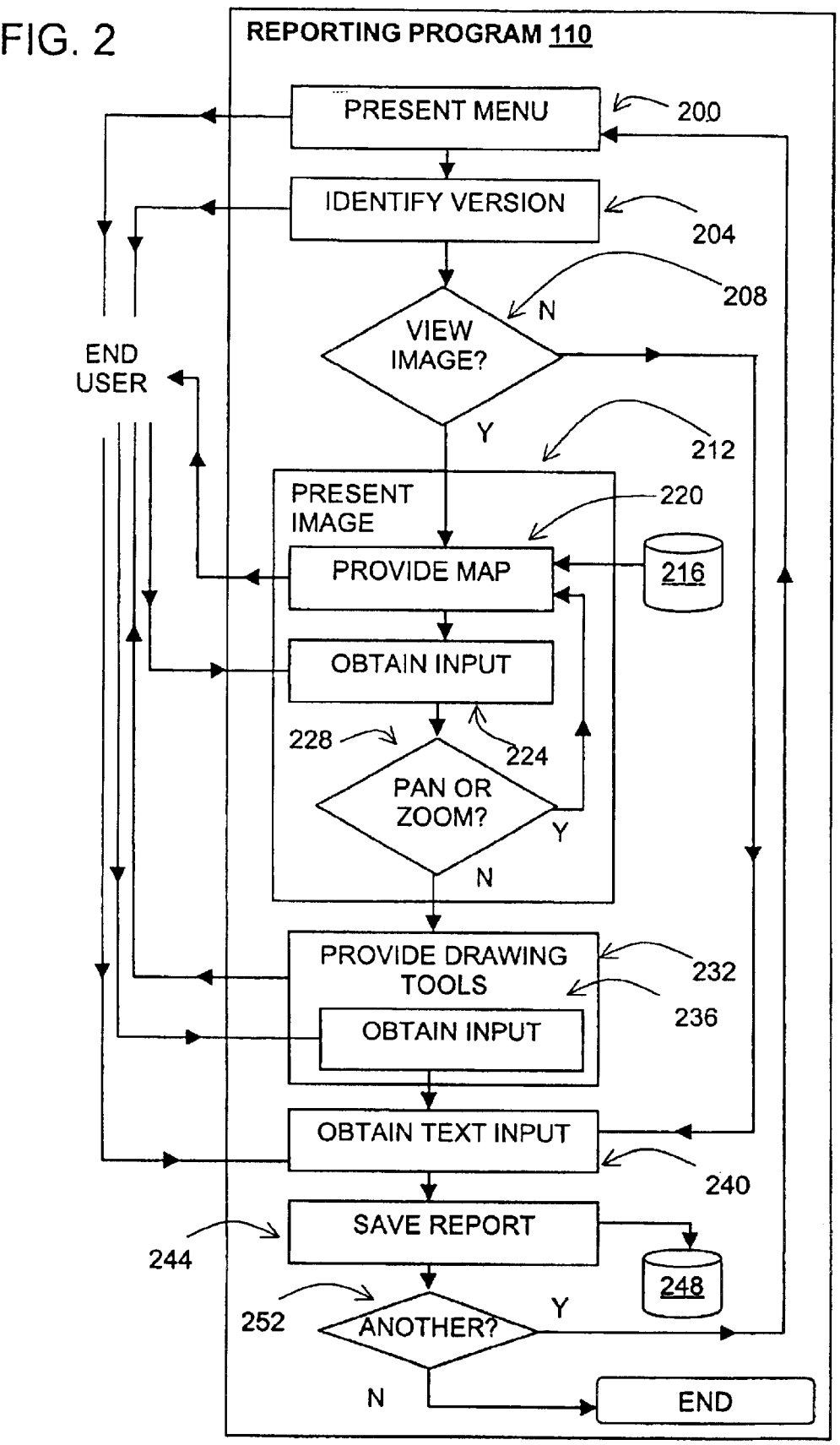
FIG. 2 is a flow chart of steps performed by the reporting program of FIG. 1.

Some of the steps performed by the reporting program 110 are shown in FIG. 2. When the end user accesses the reporting program 110, the reporting program 110 presents the user with a menu of options (Step 200). One of the options presented on the menu is to make a report about a geographic database. When the user chooses the option of making a report, the reporting program 110 requests the end user to identify the version of the geographic database to which the report pertains (Step 204). After the end user supplies information identifying the version of the database, the reporting program 110 presents the end user with the option of viewing a map image of the area about which the end user desires to make a report (Step 208). If the user chooses not to view an image of the map area, the reporting program 110 presents the user with a means to provide a text input (described below in connection with Step 240). Alternatively, if the end user chooses to view an image of the map area, the reporting program 110 presents the end user with a means to select an area (Step 212).

When the reporting program 110 presents a map image to the end user, the reporting program accesses a geographic database 216. The geographic database 216 may be a copy of, or similar or identical to, the geographic database used by the end user's navigation system. The geographic database 216 used by the reporting program 110 is preferably up-to-date, i.e., it includes all the changes reflecting all the most recent updating efforts. Thus, the geographic database 216 used by the reporting program 110 may be more up-to-date than the geographic database that was used by the end user's navigation system when the perceived error arose.

As stated above, if the end user chooses to view an image of the map area, the reporting program 110 presents the end user with a means to select an area. There are various ways that the reporting program 110 allows the end user to select the area about which to make a report. One way is by panning and zooming. According to one method, the end user is first presented with an image of a large scale map, e.g., the entire United States (Step 220). When the end user is provided with a map, the reporting program 110 allows the end user to select an area of the map, e.g., by pointing-and-clicking on a location on the map image (Steps 224 and 228).

Figure 3:
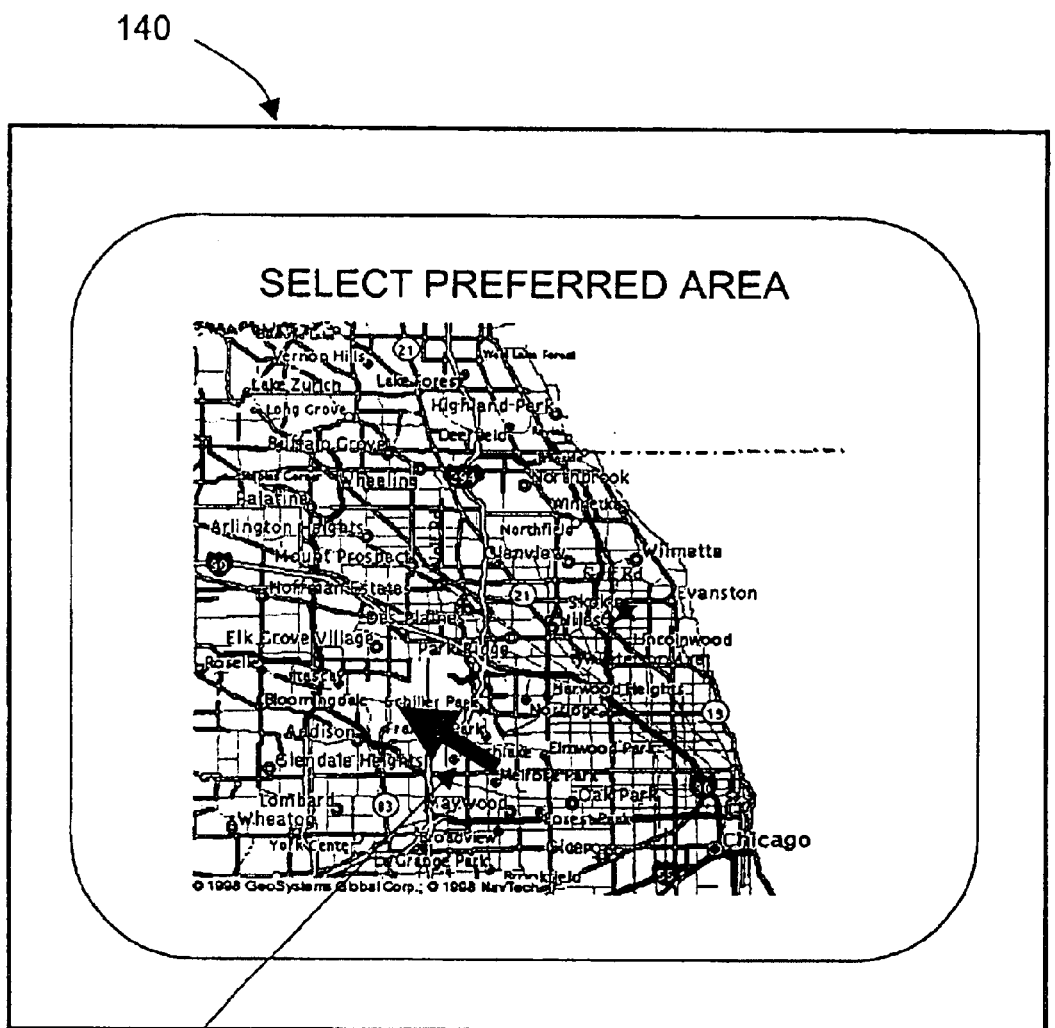
FIG. 3 illustrates an end user's computer display screen at one step of the process shown in FIG. 2.

FIG. 3 illustrates the display of the end user's computer 140 with a graphical map image displayed thereon. As shown in FIG. 3, a cursor 230 can be moved over the map image to a position in order to select the area indicated by the cursor.

Referring again to FIG. 2, when the end user selects an area of the large scale map, the reporting program 110 captures the end user's input and uses the input to present the end user with another map image of the area selected by the end user. Depending upon the end user's input, this new map image may be at a smaller scale or may be panned relative to the previous map image. By successive selections, the end user is able to operate the reporting program 110 to present a map image of the individual street segments about which the end user desires to make a report.

As stated above, there are various ways that the reporting program 110 can allow the end user to select an image of an area about which to make a report. These other ways include allowing an end user to identify the area by administrative area name (e.g., Des Plaines, Ill.), by address, by point of interest name (e.g., O'Hare Airport), by street name, by zip code, or by intersection. When the end user chooses any of these ways to select an area about which to make a report, a graphical map image of the selected area is presented to the end user on the display screen of the end user's computing platform. The reporting program 110 allows the end user to pan and zoom the map image, as described above, to obtain a map image of the area about which to make a report, at the appropriate scale.

Figure 4:
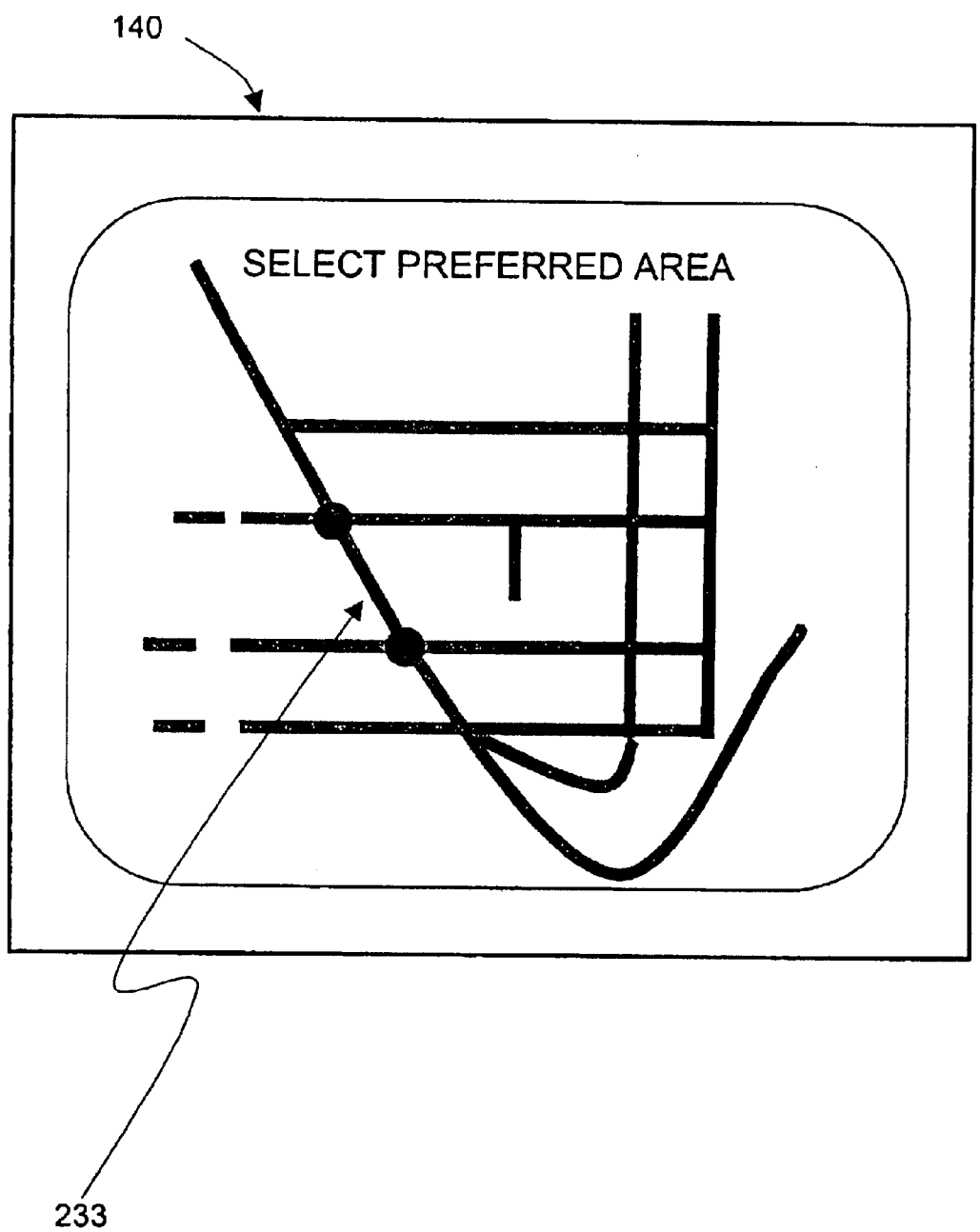
FIG. 4 illustrates use of the drawing tools to report a perceived geographic data error according to the reporting program of FIG. 1.

When the end user has a map image of the area about which he/she desires to make a report on the display screen of his/her computer, the reporting program 110 provides the end user with drawing tools (Step 232). The drawing tools include features commonly used by computer-assisted drawing programs for marking or editing images. The drawing tools include a feature that allows the end user to select one or more individual road segments. For example, by pointing-and-clicking on a road segment, the end user can select the road segment. When the end user uses the reporting program 110 to select a road segment, the road segment may be highlighted by changing color, blinking, etc. FIG. 4 illustrates the display of the end user's computer 140 with a graphical map image of individual road segments displayed thereon. As shown in FIG. 4, the end user has selected a road segment (which is shown in a different color at 233) to indicate the feature to which the report pertains.

Figure 5:
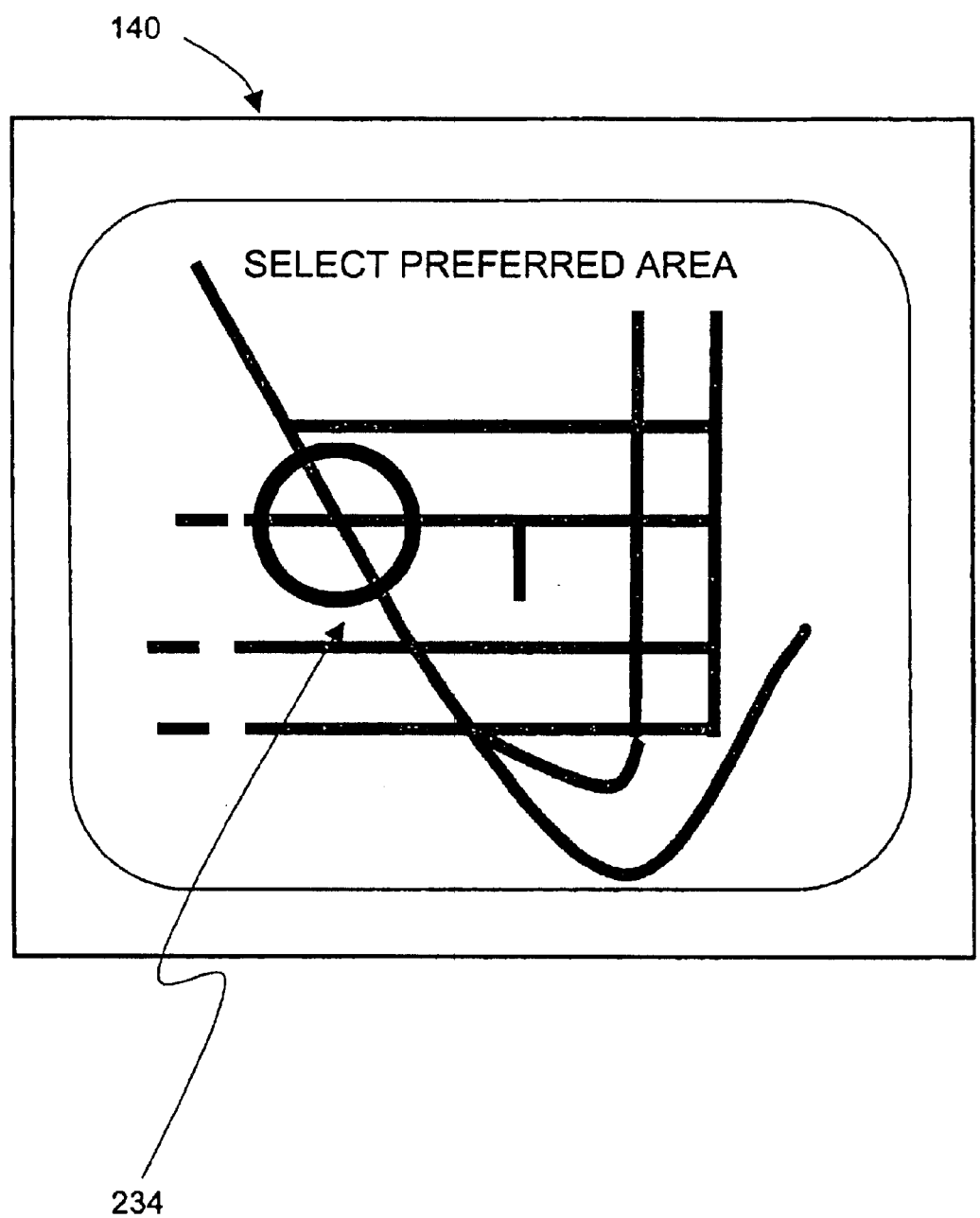
FIG. 5 illustrates another use of the drawing tools to report a perceived geographic data error according to the reporting program of FIG. 1.

The drawing tools also include a feature that allows the end user to select an area. According to this feature, the end user can draw a box or circle on the map image to define an area. FIG. 5 illustrates the display of the end user's computer 140 with a graphical map image of individual road segments displayed thereon. As shown in FIG. 5, the end user has drawn a circle 234 over a location on the map image in order to indicate the area to which the report pertains.

The drawing tools also include a feature that allows the end user to mark the image. For example, by choosing this feature, the end user is able to draw lines on the map image. This allows the end user to graphically illustrate a correction to the map image.

The following examples illustrate several ways that an end user can use the drawing tools of the reporting program 110 to make reports about perceived errors in the geographic data.

EXAMPLE 1

The end user wishes to report that two road segments, which are represented on the map image as meeting at an intersection, do not actually meet. The end user can select one of the road segments by clicking on it and then use the line draw feature to cross out a portion of the road segment where it meets with the other road segment to illustrate that the two road segments do not actually meet.

EXAMPLE 2

The end user wishes to report that the map image omits a road segment. The end user uses the line drawing feature of the reporting program to draw in the missing road segment on the map image.

EXAMPLE 3

The end user wishes to report that a road segment, which is represented as permitting vehicular traffic in two directions, is in fact a one-way street. The end user selects the road segment by clicking on it and then uses the line draw feature to draw an arrow in the single direction of permitted traffic flow.

EXAMPLE 4

The end user wishes to report that he/she was given guidance to follow a route that was not optimal. Using a line drawing feature, the end user can trace a better route along the road segments shown on the graphical map image provided by the reporting program.

Using these drawing tools, the end user is able to graphically illustrate an error or a correction to the geographic data. Referring again to FIG. 2, the reporting program 110 captures the end user's graphical input (Step 236).

Figure 6:
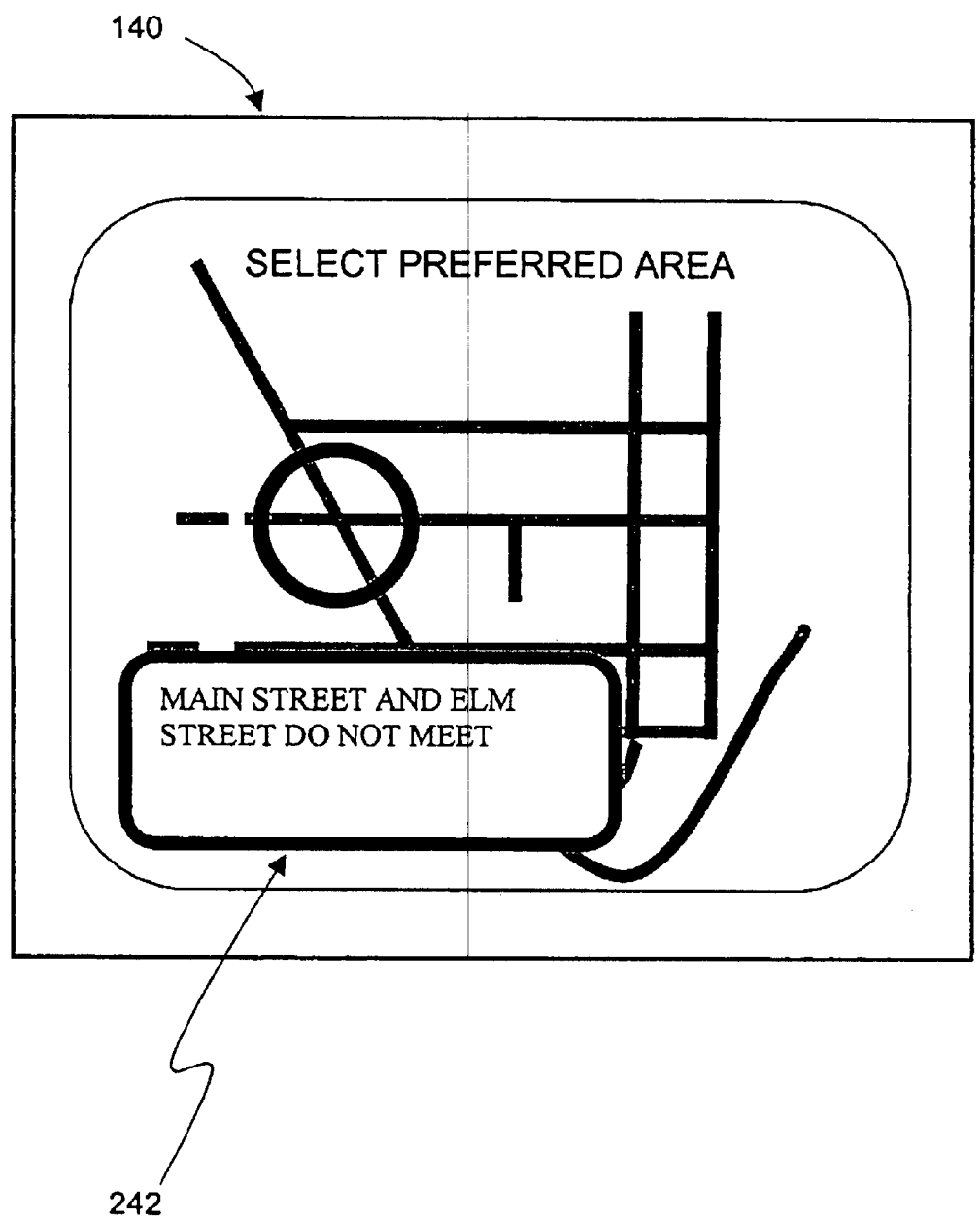
FIG. 6 illustrates still another use of the drawing tools to report a perceived geographic data error according to the reporting program of FIG. 1.

When the end user uses any of these graphical drawing features to illustrate a change to the geographic database for a report, the reporting program 110 also provides a feature that allows the end user to submit text comments (Step 240). According to this feature, the reporting program 110 may provide the end user with a text box. The text box can be opened by clicking on a menu item or link provided on the page being presented on the end user's display screen. FIG. 6 illustrates the display of the end user's computer 140 with a text box 242 that the end user can use to provide comments about a perceived error in the geographic database. The text box may be used as a substitute for or in addition to providing comments graphically. Some of the types of changes that an end user may wish to report may not be possible to express graphically. Furthermore, some end users may not know how to use the drawing tools features to clearly express the change they wish to report. Accordingly, by providing a text box, the reporting program 110 allows an end user to describe an error with the geographic data using words. The reporting program 110 captures the end user's text input.

After the end user has submitted text comments, the reporting program 110 saves the end user's graphical and text input in a report file 248 (Step 244). Then, the end user may use the reporting program again to make a report about another perceived error (Step 252) or alternatively, the end user may log off the reporting program 110. At this point, the end user may be sent a message thanking him/her for submitting the report.

Figure 7:
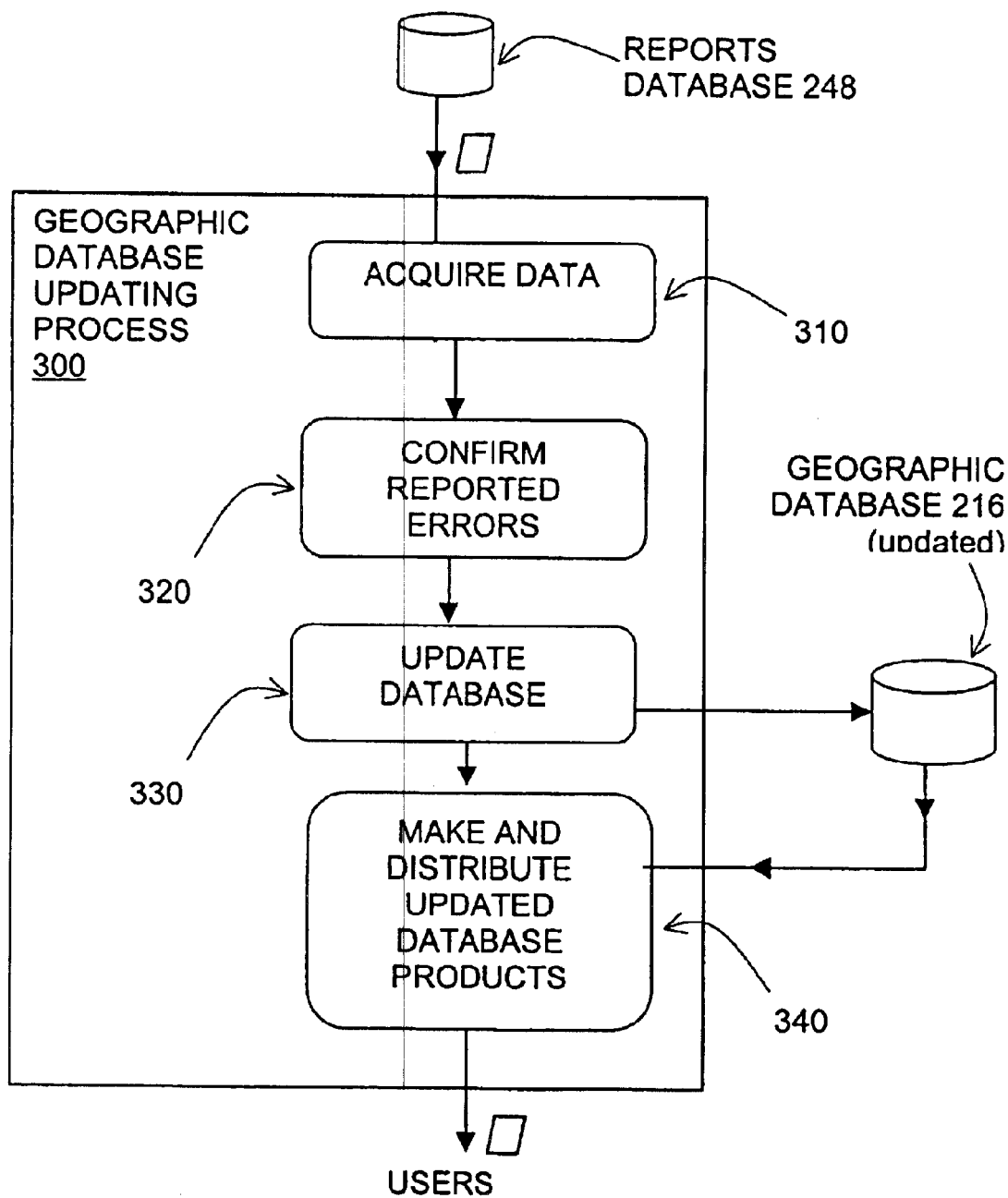
FIG. 7 is a flow chart of steps performed to update a geographic database using the reporting program of FIG. 2.

Referring to FIG. 7, the data in the reports database 248 are used in a geographic database updating process 300. The geographic database updating process 300 may be performed by the geographic database developer (100 in FIG. 1). According to one embodiment, the geographic database updating process 300 receives the data from the reports database 248 (Step 310). Each of the reports in the reports database 248 is analyzed and confirmed (Step 320). The report may be confirmed by examining an aerial photograph, by traveling out to the location represented by the data, or by other means. When the error is confirmed, the correct information is added to the geographic database, thereby forming an updated version 216 (updated) (Step 330). At this point, the end user who submitted the report concerning the error may be sent a message (e.g., by email) informing him/her that the master copy of the geographic database has been corrected and updated. When the database 216 has been updated, derived database products reflecting the updated data are made and distributed to the end users (Step 340). The end users may be provided with an opportunity to obtain or purchase copies of the updated database.

Advantages

One advantage of the disclosed system is that the graphical map image provided by the reporting program may help an end user remember details about a perceived error. As mentioned above, the reporting program may be accessed by an end user from a different computing platform than the platform that was being used by the end user to obtain the navigation-related or map-related services. For example, the end user may perceive an error while driving and using his/her navigation system, but then access the reporting program later from home using a personal computer with Internet access. When the end user accesses the reporting program later from his/her home, he/she may not remember details about the perceived error. The graphical map image provided by the reporting program may help the end user recall details about the perceived error thereby making the reporting of the error easier and more meaningful.

Another advantage of the disclosed system is that it allows an end user to know whether the perceived error has already been reported or corrected. As stated above, the reporting program uses a geographic database to provide map images to end users so that the end users can use these map images to make reports about perceived errors in the geographic database. As mentioned above, the geographic database used by the reporting program is preferably up-to-date and reflects the most recent changes and corrections. Therefore, the geographic database used by the reporting program may be more up-to-date than the geographic database used by the end user making the report. Thus, it is possible that the perceived error may already have been corrected If the end user notices that the error that he/she was going to report has already been corrected when viewing the map image provided by the reporting program, the end user can exit the reporting program and not waste any time reporting an error that has already been corrected.

Another advantage of the disclosed system is that it can be used to improve the software used by navigation systems. As stated above, an error perceived by an end user may be caused by the software used by the navigation system and not the geographic data. The reports provided by end users may be used to improve or correct the software in navigation systems to avoid or minimize these types of errors.

Another advantage of the disclosed system is that the end user is provided with an opportunity to be involved in the updating process. This involvement may help develop good will between the end user and the geographic database developer.

It is intended that the foregoing detailed description be regarded as illustrative rather than limiting and that it is understood that the following claims including all equivalents are intended to define the scope of the invention.

I claim:

1. A method of obtaining reports from end users about perceived errors associated with navigation-related or map-related features provided on computing platforms, the method comprising:

providing an on-line program accessible to the end users;
   with the on-line program, providing an end user with a graphical map image of a geographic area on a display screen of the end user; and
   with the on-line program, allowing the end user to submit a report about a perceived error in a navigation-related or map-related feature associated with the graphical map image.

2. The method of claim 1 further comprising:
   with the on-line program, allowing the end user to provide explanatory text with the report.

3. The method of claim 1 further comprising: updating a geographic database using the report.

4. The method of claim 1, wherein the navigation-related service or map-related feature is provided by an on-line provider.

5. The method of claim 1 wherein the end user accesses the on-line program from a personal computer.

6. The method of claim 1 further comprising:
   confirming the perceived error; and
   updating a geographic database to correct the perceived error.

7. The method of claim 1 wherein the perceived error is confirmed using an aerial photograph.

8. The method of claim 1 wherein the perceived error is confirmed by traveling the geographic location.

9. The method of claim 1 wherein the graphical map image includes up-to-date changes.

10. The method of claim 1 further comprising:
    updating a geographic database using the report; and
    distributing copies of the updated geographic database.

11. The method of claim 1 further comprising:
    with the on-line program, allowing the end user to select the graphical map image to show on the display screen.

12. The method of claim 1 wherein the perceived error relates to geographic data used to provide the navigation-related or map-related service.

13. The method of claim 1 wherein the perceived error relates to software programming used to provide the navigation-related or map-related service.

14. A method of reporting a perceived error in a navigation-related or map-related feature provided by a navigation system or other computing platform, the method comprising:

using a computer to access an on-line reporting program;
    using the on-line reporting program to obtain a graphical map image of a geographic area on a display screen of the computer, and
    using the on-line reporting program to submit a report about a perceived error about a navigation-related or map-related feature relative to the geographic area shown in the graphical map image.

15. The method of claim 14 further comprising:
    with the on-line reporting program, providing explanatory text with the report.

16. The method of claim 14 wherein the graphical map image includes up-to-date changes.

17. The method of claim 14 further comprising:
    using the on-line reporting program to indicate a version of a geographic database to which the perceived error relates.

18. The method of claim 14 further comprising:
    selecting the graphical map image to show on the display screen.

19. A system for collecting reports from end users about perceived geographic data used in navigation systems and other computing platforms that provide navigation-related or map-related services, the system comprising:

a geographic database;
    an on-line program accessible to the end users over a network, wherein the on-line program allows the end users to indicate geographic areas, uses the geographic database to provide graphical images of the geographic areas identified by the end users, and enables the end users to identify the perceived errors in the navigation-related or map-related services relative to the geographic areas.

20. The system of claim 19 further comprising:
    a reports database that stores the reports from the on-line program.

* * * * *